2 Sheets—Sheet 1.

C. M. BOLAND.

Glove Sewing Machine.

No. 9,586. Reissued Feb. 22, 1881.

WITNESSES:

C. Neveux

H. Bedgwick

INVENTOR:

C. M. Boland

BY Munn & Co

ATTORNEYS.

2 Sheets—Sheet 2.
C. M. BOLAND.
Glove Sewing Machine.
No. 9,586. Reissued Feb. 22, 1881.
Fig. 3.
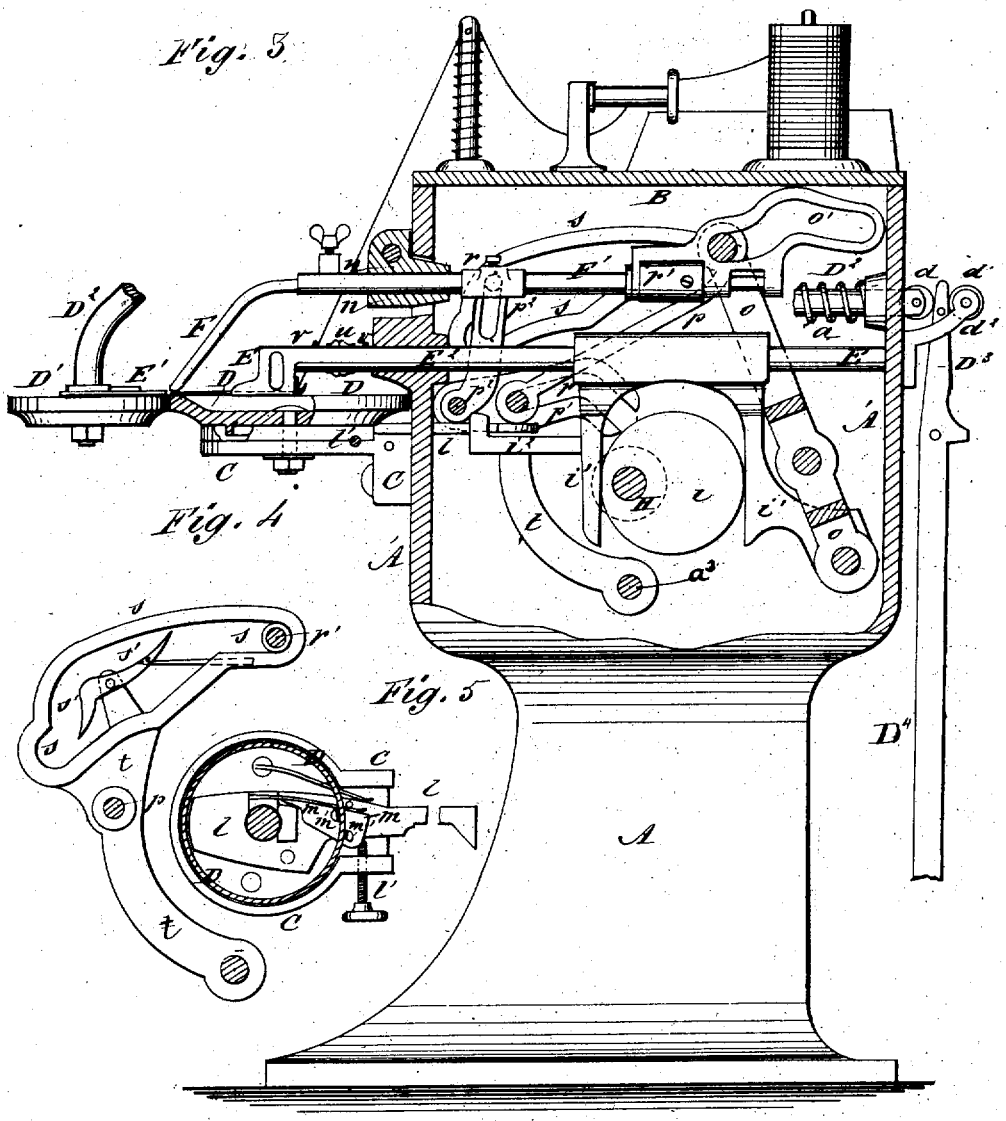
Fig. 4
Fig. 5
Fig. 6
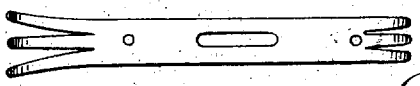
WITNESSES:
C. Neaux
C. Sedgwick
INVENTOR:
C. M. Boland
BY Munn & Co
ATTORNEYS.

UNITED STATES PATENT OFFICE.

CLAUDE M. BOLAND, OF NEW YORK, N. Y.

GLOVE-SEWING MACHINE.

SPECIFICATION forming part of Reissued Letters Patent No. 9,586, dated February 22, 1881.

Original No. 202,695, dated April 23, 1878. Application for reissue filed July 1, 1880.

*To all whom it may concern:*

Be it known that I, CLAUDE M. BOLAND, of the city, county, and State of New York, have invented a new and useful Improvement in Glove-Sewing Machines, of which the following is a specification.

Figure 1:
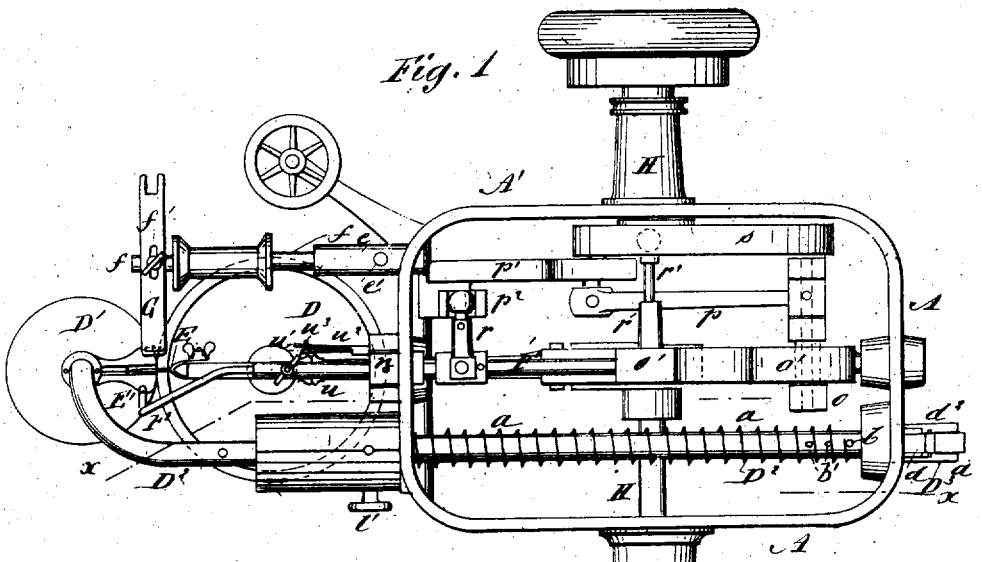
Figure 2:
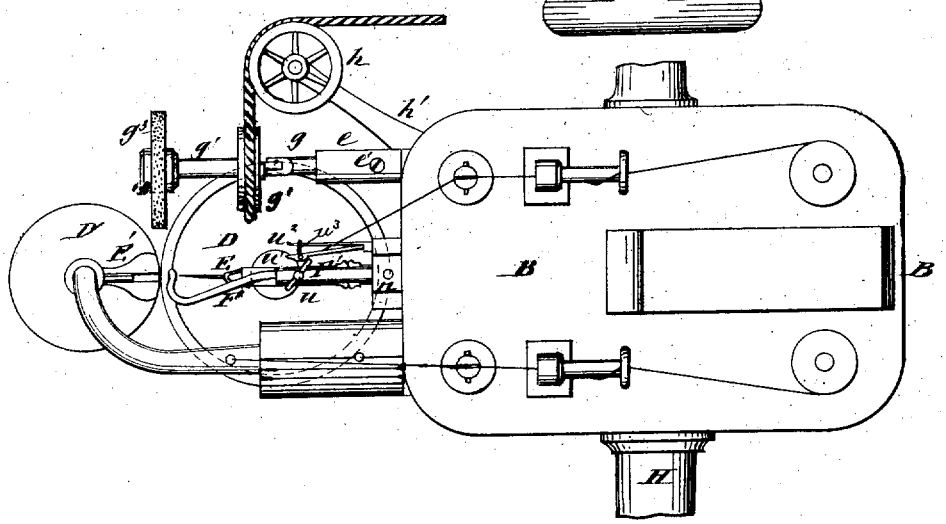

In the accompanying drawings, Figure 1 represents a top view of my improved machine for sewing gloves, with top part removed. Fig. 2 is a top view of the same as adapted for sewing furs. Fig. 3 is a sectional side elevation of the machine on line *x x*, Fig. 1; Fig. 4, a detail side view of part of the operating mechanism; Fig. 5, a detail view of the friction-clutch for operating the feed-disk, and Fig. 6 is a detail view of the guide-arm for the leather pieces.

Similar letters of reference indicate corresponding parts.

The invention relates to that class of machines for sewing gloves and furs in which are employed two parallel feed-disks, a reciprocating needle, and an oscillating looper; and the invention consists in the construction and arrangement of parts, which will be hereinafter fully set forth, and then specifically claimed.

Referring to the drawings which illustrate my invention, A represents the supporting-standard; and A′ the casing, cast in one piece therewith, for inclosing the operating appliance of my glove-sewing machine. The standard A is securely screwed to a table or other support, as in the common sewing-machines, and the casing A′ closed by a top, B, on which the customary tension devices for the threads and posts for the spools are arranged.

To the front part of the casing A′ is attached a fixed bracket, C, that supports on its circular horizontal guide part an intermittingly-revolving feed-disk, D, with circular bottom flange, that is engaged by a friction-clutch operated from the driving-shaft. A second feed-disk, D′, is supported at the end of a downwardly-bent arm, $D^2$, which is extended back through the casing A′ and guided in suitable sockets above the disk. The outer feed-disk, D′, is tightly pressed against disk D by the action of a strong spiral or other spring, *a*, on the straight rear extension of arm $D^2$, the spring *a* being placed inside of casing A′ and the tension of the same regulated by a pin, *b*, and socket-holes *b*′, near the rear end of the arm $D^2$, as shown in Fig. 1. The peripheries of both feed-disks are milled or serrated, so that the goods to be sewed are firmly compressed between the same and fed to the needle by the intermittent rotary motion of the main disk, which imparts motion to the outer disk by the frictional contact secured by the spring *a*.

The rear end of the disk-arm $D^2$ projects at the rear of the casing A′, and has a friction-roller, *d*, between which and a second roller, *d*′, of a fixed bracket, $d^2$, a wedge-shaped head, $D^3$, of a rod, $D^4$, swings or slides, being operated either by hand or by a treadle, so as to throw the outer disk forward and interrupt its contact with the disk D, to allow the introduction of the work between the disks, or, on the release of the treadle, the firm clamping and taking hold of the work between the same.

The goods are sewed in the customary manner by the threads of a reciprocating needle, E, that passes at right angles through the leather and across the contact-point of the disks, and of a looper, F, the outer disk having a slotted guard-plate, E′, that protects the point of a needle against injury. The looper F passes to and fro over the edges of the leather, and binds them together by the cross-loops of the well-known glove-stitch. The needle receives its reciprocating motion, and the looper its complex motion, from mechanism arranged within the casing and set in motion by a main shaft passing laterally through the casing, and being revolved by connection with a treadle or by other suitable power.

Parallel to the needle-bar, and at that side from which the work is introduced to the disks, is arranged on the casing A′, a fixed socket, *e*, into which, by a suitable clamp-screw, *e*′, a rod, *f*, is secured, that carries one or more spools for one or more ornamental face-threads of the same or different colors, and at the outer end a guide-arm, G, that is adjusted at its slotted middle part by a set-screw, *f*′. The face-thread passes from the spool or spools over the upper recessed or perforated end of the guide-arm G and through a double perforation at the lower curved end to the work, being taken up by the looping-thread and placed in position over the edges of the leather, so as to cover them and impart to the seam an ornamental and finished appearance. The facing-thread is placed on top of the joint of the two pieces of leather, so that the needle passing through the leather may form a loop in the side toward the operator. This is caught by the looper and drawn down over the edges of the leather and facing, which together form a ridge. Of course no loops are formed with the facing-thread which remains upon the ridge of the joint, and is held by the other threads, which form a seam by passing through the cloth and around the facing-thread. The facing-thread, being merely intended for ornamentation, never passes through a needle. The machine is threaded up by simply passing sewing-thread through the needle in the usual way.

Fig. 6 illustrates a modified form of guide-arm having its ends provided with different-sized recesses.

As shown in Fig. 2 the machine is used for sewing furs. In this instance a rod, $g$, having a jointed end piece, is inserted into the socket $e$ and fastened therein. The jointed end piece of the rod $g$ receives a sleeve, $g'$, which carries a disk-brush, $g^3$, and a band-pulley, $g^2$, for revolving said brush and sleeve. The driving-band is stretched over two intermediate pulleys, $h$, supported on side bracket, $h'$, of the casing A'. The revolving disk-brush $g^3$ serves to brush the hairs of the fur back from the edges of the pieces to be connected, and thereby admits the sewing of the same, clear of hairs, in an easy and perfect manner.

The mechanism for imparting the required motion to the working part of the machine—namely, to the feed-disks, needle, and looper—is constructed in such a manner that the driving-shaft H may be turned either to the right or left and still the regular working of the parts be produced. This facilitates the working of the machine, and does not make the same liable to get out of order.

The working mechanism is shown in Figs. 1 and 3, and is set in motion by an eccentric, $i$, of the main shaft H, engaging first the arms of a U-shaped piece, $i'$, secured to the horizontal needle-bar $E^2$, so as to impart thereby reciprocating motion to the same. A fixed forwardly-extending arm, $i^2$, engages, by an inclined face-portion, the inclined rear end of a spring-acted arm, $l$, that swings on the center piece of the main disk D. The extent of swinging motion of the arm $l$ is adjusted by a lateral set-screw, $l'$, so that the oscillations of arm $l$ may be longer or shorter. A sliding and spring-acted plate, $m$, with projecting lugs $m'$, rests on the top of the arm $l$, the lugs binding at opposite sides on the bottom flange of the disk D and moving the disk forward with the side motion of arm $l$, but releasing the flange in returning. Thus a friction-clutch is formed that imparts intermittent rotary motion to the disks, feeding the same to a greater or less extent, according to the motion of arm $l$, and thereby regulating the lengths of stitches in a reliable manner.

The complex motion of the looper is obtained by a jointly-working mechanism that gives a threefold motion to the looper-bar F', which is for that purpose made to slide in an oscillating guide-sleeve, $n$, that is pivoted into a recess at the front part of casing A'.

The rear arm of the U-shaped piece $i'$ of the reciprocating needle-bar imparts oscillating motion to a fulcrumed lever, $o$, whose upper end slides in a curved loop, $o'$, of the shape of a flat S, the loop being secured by suitable sleeves to the rear end of the looper-bar, so as to impart a kind of oscillating motion to the looper.

From the upper end of the oscillating lever $o$, and pivoted to the yoked lateral pivot-pin of the same, extends a link, $p$, that engages a curved and recessed arm, $p'$, which is pivoted to the inner front plate of casing A', and oscillated by the motion of the same. The elbow-lever $p'$ $p^2$ engages, by its forked upper end, the friction-roller of the rigid arm $r$, that extends at right angles from the looper-bar, so as to impart thereby, simultaneously with the oscillating motion of the looper, a short longitudinal reciprocating motion to the same. A second arm, $r'$, that is clamped at right angles to the looper-bar, and parallel to the arm $r$, extends, by a friction-roller at its outer end, into a guide-loop, $s$, of a swinging lever, $t$, that is pivoted at its lower part to the casing A' at $a^3$, and connected at the middle part to link $p$, whose pivot-pin is extended sidewise to the lever $t$. The elongated loop $s$ is provided with a center post and a fulcrumed and spring-acted guide-piece, $s'$, having curved and pointed ends, as shown in detail in Fig. 4, over which the friction-roller of the arm $r'$ passes on the return motion of the looper-bar, while it passes below the same, along the lower edge of the loop $s$, on the forward motion of the looper-bar. This alternating passage of the arm $r'$ above and below the oscillating spring-guide $s'$ imparts to the looper a lateral advancing and receding motion, so as to produce, in connection with the oscillating up-and-down and short reciprocating motions of the other parts, the peculiar motions of the looper by which the thread is carried over the edge of the leather and the loops tightened.

The stitching-thread is stretched to bind off the looping-thread, during the forward motion of the needle-bar, by means of a sliding and annularly-grooved sleeve, $u$, sliding on said bar, which bears against the enlarged and ribbed end of a clamping spring-finger, $u'$, the ribbed end springing into the groove of the sleeve, and thereby retaining the spring-finger until the return motion of the needle-bar carries the sleeve back. The sliding sleeve is carried along by stop-pins V of the needle-bar, the sleeve securing the tight holding of the thread between the spring-finger and a fixed finger, $u^2$, while a stud, $u^3$, of the spring-finger prevents the escape of the thread from between the fingers. On the return motion of the needle-bar the fingers spread apart and liberate the thread, so as to enable the needle to take up, by the forward motion of the bar, the required length of thread, drawing the same tightly by the return motion of the same.

Having thus fully described my invention, I claim as new and desire to secure by Letters Patent—

1. In a sewing-machine, the combination of the two feed-disks D D′, arranged in horizontal position and in contact, and a bent arm, $D^2$, which suspends and serves as a journal for the outer disk, whereby a free space is left beneath the latter, as shown and described.

2. In a glove-sewing machine, the combination of intermittingly-revolving feed-disks, a reciprocating stitching-needle, a binding-off looper, and an adjustable guide-arm for laying over the seam one or more ornamental face-threads, substantially as and for the purpose set forth.

3. The combination of the intermittingly-revolving feed-disks, reciprocating stitching-needle, and binding-off looper, with a revolving brush-disk, to clear the edges of fur from hairs in sewing, substantially as specified.

4. The combination of the adjustable feed-disk $D^3$, horizontal supporting-arm $D^2$, encircling spiral spring *a*, and adjusting-lever $D^4$, with the feed-disk D′, and frame or casing A′, having guide-sockets for the supporting-arm, as and for the purpose set forth.

5. The combination, in a sewing-machine, of the lever *o*, loop *o′*, link *p*, curved elbow-lever $p'$ $p^2$, and the swinging lever *t*, having guide-loop *s* and spring-pressed guide-piece *s′*, the looper-bar F′, having arms *r r′*, the shaft and eccentric H *i*, the needle-bar $E^2$, provided with the yoke *i′*, and the casing A′, having the rocking bearing *n*, as and for the purpose herein set forth.

CLAUDE M. BOLAND.

Witnesses:
OSCAR F. GUNZ,
C. SEDGWICK.